(12) United States Patent
Hakalin

(10) Patent No.: US 7,177,593 B2
(45) Date of Patent: Feb. 13, 2007

(54) ESTIMATING COMMUNICATION QUALITY

(75) Inventor: Petteri Hakalin, Oulu (FI)

(73) Assignee: Nokia Corporation, Espoo (FI)

( * ) Notice: Subject to any disclaimer, the term of this patent is extended or adjusted under 35 U.S.C. 154(b) by 177 days.

(21) Appl. No.: 10/240,672

(22) PCT Filed: Apr. 3, 2001

(86) PCT No.: PCT/IB01/00628

§ 371 (c)(1),
(2), (4) Date: Mar. 26, 2003

(87) PCT Pub. No.: WO01/76123

PCT Pub. Date: Oct. 11, 2001

(65) Prior Publication Data

US 2003/0176184 A1    Sep. 18, 2003

(30) Foreign Application Priority Data

Apr. 3, 2000  (GB) ................... 0008119.0

(51) Int. Cl.
*H04B 17/00*  (2006.01)
(52) U.S. Cl. .............. 455/39; 455/67.13; 455/226.3; 455/226.4
(58) Field of Classification Search .......... 455/72, 455/67.11, 67.13, 135, 501, 423, 452.2, 67.7, 455/226.1, 226.3, 226.4, 67.16, 115.4, 115.1, 455/115.3, 226.2; 375/225, 240; 714/704, 714/746; 370/252
See application file for complete search history.

(56) References Cited

U.S. PATENT DOCUMENTS

| | | | |
|---|---|---|---|
| 5,673,266 A | 9/1997 | Li | |
| 5,734,678 A * | 3/1998 | Paneth et al. ............... | 375/240 |
| 5,754,946 A * | 5/1998 | Cameron et al. .......... | 340/7.22 |
| 5,784,406 A * | 7/1998 | DeJaco et al. ............. | 375/224 |
| 5,828,672 A | 10/1998 | Labonte et al. | |
| 5,936,979 A * | 8/1999 | Jyrkka ........................ | 714/763 |
| 5,944,844 A * | 8/1999 | Piirainen et al. ............ | 714/704 |
| 6,134,220 A * | 10/2000 | Le Strat et al. ............. | 370/252 |
| 6,157,830 A * | 12/2000 | Minde et al. ............... | 455/424 |
| 6,167,031 A * | 12/2000 | Olofsson et al. ........... | 370/252 |
| 6,240,282 B1 * | 5/2001 | Kleider et al. ........... | 455/226.1 |
| 6,308,082 B1 * | 10/2001 | Kronestedt et al. ....... | 455/67.11 |
| 6,539,205 B1 * | 3/2003 | Wan et al. .................. | 370/465 |

(Continued)

FOREIGN PATENT DOCUMENTS

EP    0 648 032 A1    4/1995

(Continued)

*Primary Examiner*—Simon Nguyen
(74) *Attorney, Agent, or Firm*—Squire, Sanders & Dempsey L.L.P.

(57) ABSTRACT

A method for estimating quality of communications between a transmitter and a receiver over a communications link operable to carry data in at least one of a plurality of different compressed forms, the method comprising: detecting an error rate of the communications as received; receiving at a quality estimation unit an indication of the detected error rate and an indication of the at least one of the plurality of compressed forms in use over the link; and the quality estimation unit estimating the quality of the communications by means of both the indication of the detected error rate and the indication of the at least one of the plurality of compressed forms.

27 Claims, 3 Drawing Sheets

AMR codec modes

U.S. PATENT DOCUMENTS 6,643,815 B1 * 11/2003 Davis et al. ................ 714/758
6,646,995 B1 * 11/2003 Le Strat et al. ............. 370/252
6,650,872 B1 * 11/2003 Karlsson .................. 455/67.11

FOREIGN PATENT DOCUMENTS

| | | | |
|---|---|---|---|
| EP | 0 853 393 A1 | | 7/1998 |
| EP | 0 986 206 A1 | | 3/2000 |
| GB | 2 287 383 A | * | 3/1994 |
| WO | WO 95/28814 | | 10/1995 |

* cited by examiner

ESTIMATING COMMUNICATION QUALITY

This invention relates to estimating communication quality, for example to improving estimation of error rates in received data. The invention is preferably suitable for use in a telecommunications system such as a cellular radio telecommunications network.

Figure 1:
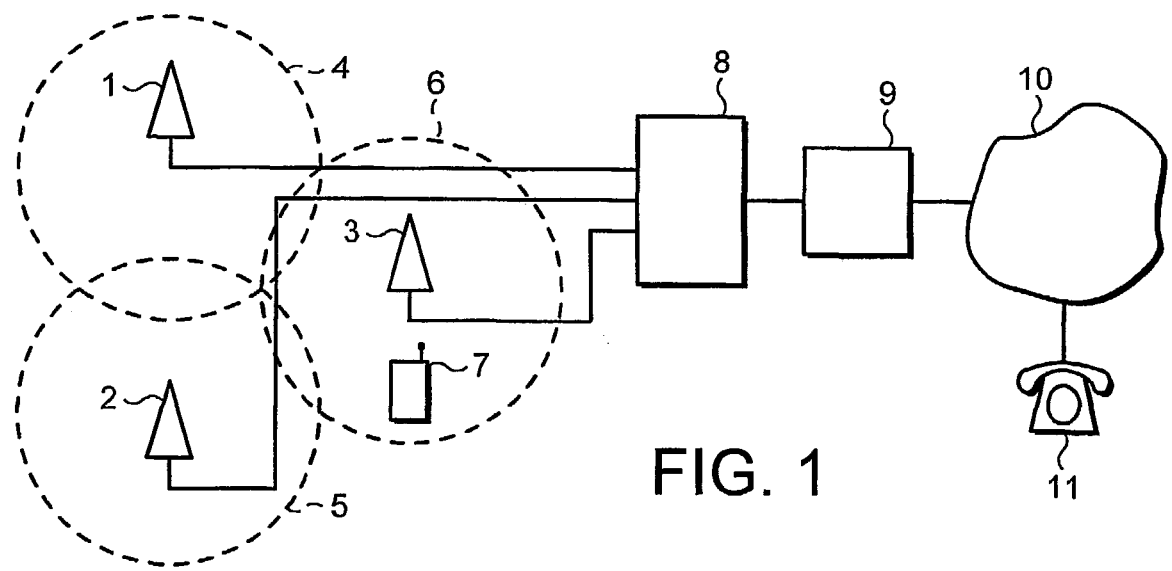

FIG. 1 shows schematically the configuration of a typical cellular radio telecommunications network such as a GSM (Global System for Mobile Communications) system. The network comprises a number of base transmission stations (BTSS) 1, 2, 3. Each base-station has a radio transceiver capable of transmitting radio signals to and receiving radio signals from the area of a cell 4, 5, 6 etc. next to the base-station. By means of these signals the base-station can communicate with a mobile station (MS) terminal 7 in that cell, which itself includes a radio transceiver. Each base station is connected via a base station controller 8 to a mobile switching centre (MSC) (not shown), which is linked in turn via a gateway MSC 9 to the public telephone network 10 and/or to other networks such as packet data networks. By means of this system a user of the MS 7 can establish a telephone call to a terminal 11 in another network.

Figure 2:
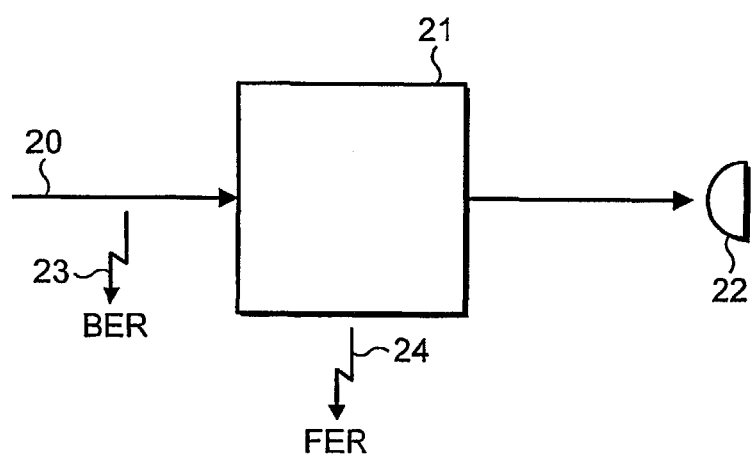

The signals between a BTS and an MS carry digital data. Analogue voice data to be carried over the link is encoded into digital data using a suitable speech codec. The encoded data is then allocated to time slots and transmitted in those time slots to the recipient unit. In typical TDMA systems a group of consecutive time slots (e.g. 8 time slots in the GSM system) make up a TDMA frame. For example, in the GSM system TDMA frame is made up of 8 consecutive time slots. Up to 8 different users at full data rate can be allocated to a single TDMA frame, each user having its own time slot. A slot may alternatively be shared between two users at half data rate, in which case those users are allocated the same timeslot but in alternate TDMA frames. A user's speech data is carried in the frames allocated to that user. If the user is a full data rate user then a speech frame of the user will occupy one timeslot of eight consecutive TDMA frames: for example if a TDMA frame lasts for 4,615 ms (as in GSM), one speech frame will taking 8×4,615 ms to be fully sent. If the user is a half data rate user his speech frame contains half as much data as that of a full rate user, and occupies one timeslot of four alternate TDMA frames. Thus in GSM the total time taken to transmit a half rate speech frame is essentially the same as the time taken to transmit a full rate speech frame. At the recipient unit the data is decoded to regenerate the analogue voice data. FIG. 2 illustrates schematically the receiver path in the mobile station. (The considerations at the BTS are analogous). Incoming received data at 20 is passed to a decoder 21. The decoded analogue voice signals are passed to an output unit 22.

In typical systems the quality or error rate of the link is estimated by measuring characteristics of the received signal. A bit error rate (BER) before channel decoding can be estimated for the received digital bitstream, as indicated schematically at 23. The bit error rate represents the ration of badly received bits to the total number of received bits. In addition, using check bits that are transmitted as part of the bitstream the decoder 21 can detect badly received voice data frames. This allows a frame erasure rate (FER) to be determined, as indicated schematically at 24. The frame erasure rate represents the percentage of received frames being dropped due to a high number of non-corrected bit errors in the frame. Other methods can be used to determine whether a received frame is to be considered as bad. For example, if the BER before channel decoding is high the frame could automatically be assumed to be bad, even if the CRC would indicate that the frame was acceptable. This is especially significant in normal full rate data reception, where the CRC occupies three bits, so even if plain noise were sent one in eight frames could on average be taken to be a valid frame In a typical system such as GSM the BER before channel decoding is estimated and that estimate reported to a control unit which can control the system so as to maintain adequate link quality, for example by instructing an increase or decrease in transmission power or a handover of an MS to another BTS.

The estimated BER before channel decoding is a direct indication of the level of errors over the link and has therefore been used in prior systems as an indication of the quality of the link on which to base such control measures. In the conventional GSM system only one voice codec, or only very few codecs, have been available. Therefore, in many cases the relationship between BER before channel decoding and perceived link quality has been easily predictable, although problems exist for example between frequency hopping and non-hopping channels. However, with the implementation of more recent developments that make use of variable compression ratios and alternative error correction techniques—such as AMR (adaptive multirate), GPRS (general packet radio service) and EGPRS (extended GPRS) or +ECSD equivalents—the BER becomes a less accurate indicator of true link quality, because the true quality of received voice data as perceived by a user is also dependant on the level of compression and/or error correction that can be performed under the protocols in use over the link. As the proportion of received bits used for error correction increases relative to those used for encoded voice data the potential for efficient error correction increases and BER before channel decoding becomes less accurate as an indicator of link quality.

In the GSM system the conventional quality measure (RxQual) is based on the pseudo bit-error rate (pseudoBER) or an estimate of the BER made before channel decoding, which is an estimate of the bit errors over the air interface. The (pseudo) BER is calculated before channel decoding. While the robustness against channel errors in AMR operations depends on the codec mode in use, the real performance of the connection cannot be estimated from RxQual alone: knowledge of the codec mode in use is needed. Moreover, since the theoretical maximum link adaptation rate of AMR is $\frac{1}{40}$ ms, the codec mode can change several (up to a maximum of 12) times during the normal measurement period of GSM (480 ms). This means that the actual BER (after channel decoding) (and FER) of the connection depends on the raw bit error rate of each traffic channel (TCH) frame during the connection and the codec modes used in those frames.

The correct quality information is especially important for handover and power control algorithms where one of the most important criterion to increase or decrease the transmit powers or trigger the handovers is the quality of the connection.

Figure 3:
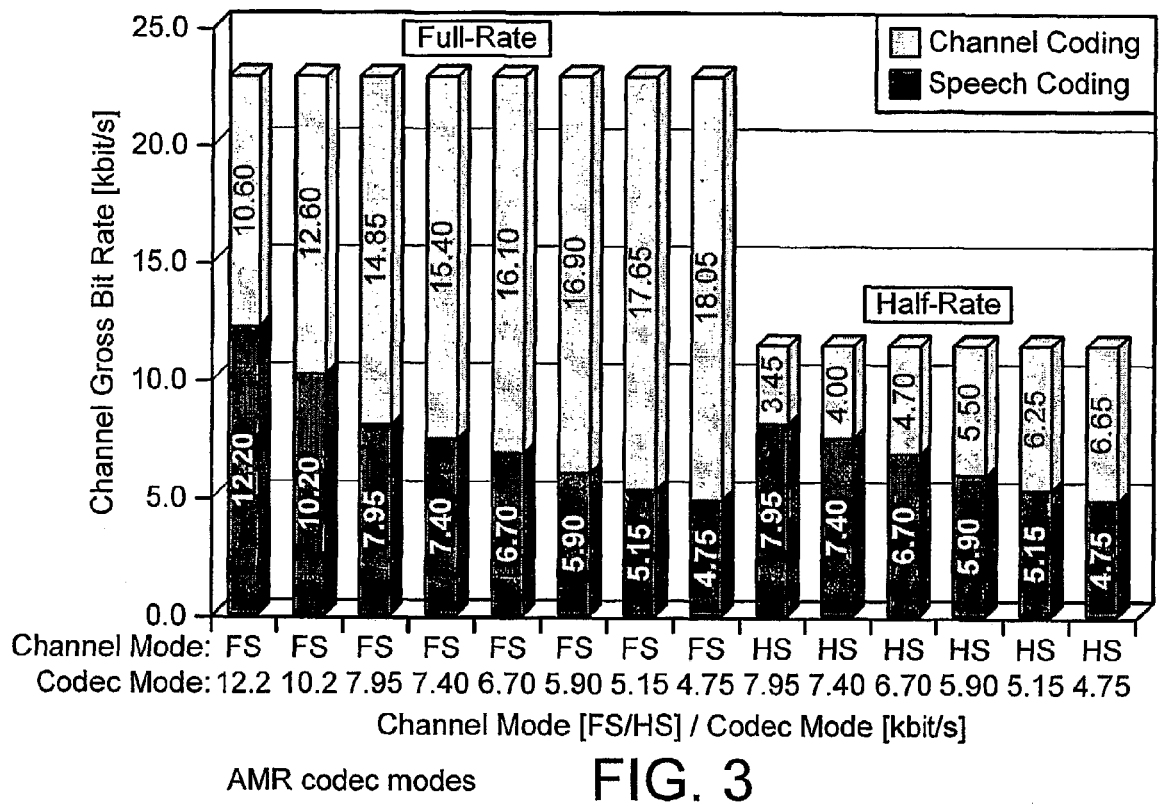
Figure 4:
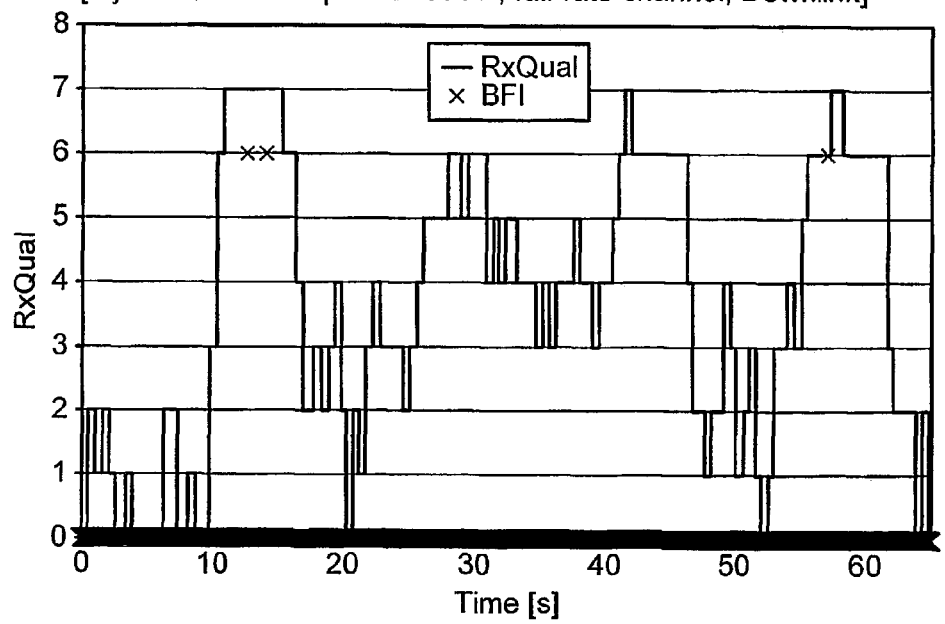

FIG. 3 illustrates AMR codec modes. An example of simulation results where the most robust codec mode of AMR was used is shown in FIG. 4. Note that while the connection quality was in lowest RXQUAL class for several seconds during the simulation, the amount of actual frame erasures was still acceptable. In normal FR connection this would have meant a significant break in the speech or even a dropped call.

One option to provide a more accurate measure of quality would be to send measured uplink FER information from BTS to BSC. However, this would only address the quality measurement problems of the uplink because downlink FER is not available in current GSM systems. This is especially significant since the downlink is normally considered to be the limiting path in terms of interference. Another option would be to use the normal RXQUAL measure in handover and power control and to set the RXQUAL thresholds according, for example, to the performance of signaling channels. This would however mean a compromise in the performance tuning of AMR especially if only high modes of the AMR were used.

There is therefore a need for a means of providing a more accurate indicator of link quality, for example to allow link quality to be better controlled.

According to one aspect of the present invention there is provided a method for estimating quality of communications between a transmitter and a receiver over a communications link operable to carry data in at least one of a plurality of different compressed forms, the method comprising: detecting an error rate of the communications as received; receiving at a quality estimation unit an indication of the detected error rate and an indication of the at least one of the plurality of compressed forms in use over the link; and the quality estimation unit estimating the quality of the communications by means of both the indication of the detected error rate and the indication of the at least one of the plurality of compressed forms.

According to a second aspect of the present invention there is provided a communications system comprising: a transmitter and a receiver capable of communicating over a communications link operable to carry data in at least one of a plurality of different compressed forms; error rate detection apparatus for detecting an error rate of the communications as received; and a quality estimation unit for receiving an indication of the detected error rate and an indication of the at least one of the plurality of compressed forms in use over the link, and estimating the quality of the communications by means of both the indication of the detected error rate and the indication of the at least one of the plurality of compressed forms.

According to a third aspect of the present invention there is provided a network element for operation in a communications system in which a transmitter and a receiver can communicate over a communications link operable to carry data in at least one of a plurality of different compressed forms; the network element comprising: a transmitter or a receiver capable of communicating over a communications link operable to carry data in at least one of a plurality of different compressed forms; error rate detection apparatus for detecting an error rate of the communications as received; and a quality estimation unit for receiving an indication of the detected error rate and an indication of the at least one of the plurality of compressed forms in use over the link, and estimating the quality of the communications by means of both the indication of the detected error rate and the indication of the at least one of the plurality of compressed forms.

The data is preferably speech data, but could be other data such as video data or text data. The data is suitably carried in digital form.

The different compressed forms are suitably forms resulting from compression by different codecs. Those codecs may together form a multi-rate coding scheme. The multi-rate coding scheme may involve the selection from time to time of one of the codecs from the set on the basis of detected conditions of the link.

The error rate may be an estimation of bit error rate, preferably before channel decoding, or a pseudo bit error rate. Other measures of error rate may be used, especially in systems other than the GSM system.

One of the transmitter and the receiver may be a base transmission station. The base transmission station may be under the control of a base station controller. The other of the transmitter and receiver is a mobile station. The receiver unit may also be capable of transmitting signals to the transmitter, which may be capable of receiving them.

The quality estimation unit may be located at the base station controller.

The link may be a traffic channel. The link may be part of a radio communications channel between the transmitter and the receiver, which may also include control channels.

The indication of the detected error rate suitably includes information indicative of a detected error rate for communications over the link from the transmitter to the receiver (and suitably from the receiver to the transmitter). Data over the link is sent in the form of data frames and the indication of the detected error rate includes a value of error rate for each frame for communications from the transmitter to the receiver, and an average value of error rate for a plurality of frames for communications from the receiver to the transmitter. In this case, preferably the receiver is a mobile station and the transmitter is a base transmission station.

Suitably the indication of the detected error rate includes an average value of error rate for a plurality of frames for communications from the transmitter to the receiver.

Suitably data over the link is sent from the transmitter to the receiver in the form of data frames and the indication of at least one of the plurality of compressed forms comprises an indication of one of the forms for each of the frames.

Data over the link may be sent from the transmitter to the receiver in the form of data frames and the indication of at least one of the plurality of compressed forms comprises an indication of one of the forms for only some of the frames. The data over the link is sent from the transmitter to the receiver in the form of groups of data frames and the indication of at least one of the plurality of compressed forms comprises an indication of one of the forms for the first frame of each group and an indication of one of the forms for the last frame of each group. The groups may be multiframes. The frames may be sent in one or more TDMA frames. Each TDMA frame preferably occupies 4.615 ms. For example, in the GSM system TDMA frame is made up of 8 consecutive time slots. Up to 8 different users at full data rate can be allocated to a single TDMA frame, each user having its own time slot. A slot may alternatively be shared between two users at half data rate, in which case those users are allocated the same timeslot but in alternate frames. A user's speech data is carried in the frames allocated to that user. If the user is a full data rate user then a speech frame of the user will occupy one timeslot of eight consecutive TDMA frames: for example if a TDMA frame lasts for 4,615 ms (as in GSM), one speech frame will taking 8×4,615 ms to be fully sent. If the user is a half data rate user his speech frame contains half as much data as that of a full rate user, and occupies one timeslot of four alternate TDMA frames. Thus in GSM the total time taken to transmit a half rate speech frame is essentially the same as the time taken to transmit a full rate speech frame. Each group of frames preferably comprises 24 frames, or 26 frames including traffic and control frames. The data over the link is suitably sent from the transmitter to the receiver in the form of groups of data frames and the indication of at least one of the plurality of compressed forms comprises an indication of one of the forms for a single frame of each group. The groups may be multiframes. Each group of frames preferably comprises 24 frames, or 26 frames including traffic and control frames.

Each group of frames suitably corresponds to a measurement period. The said averaging of error rates is preferably performed over that period, or over a longer period.

The method may comprise the step of limiting the transmitter and the receiver to using a single one of the compressed forms over the link in each measurement period, which may be a multiframe.

The transmitter and the receiver are preferably operable according to the Global System for Mobile Communications or a derivative thereof.

Figure 5:
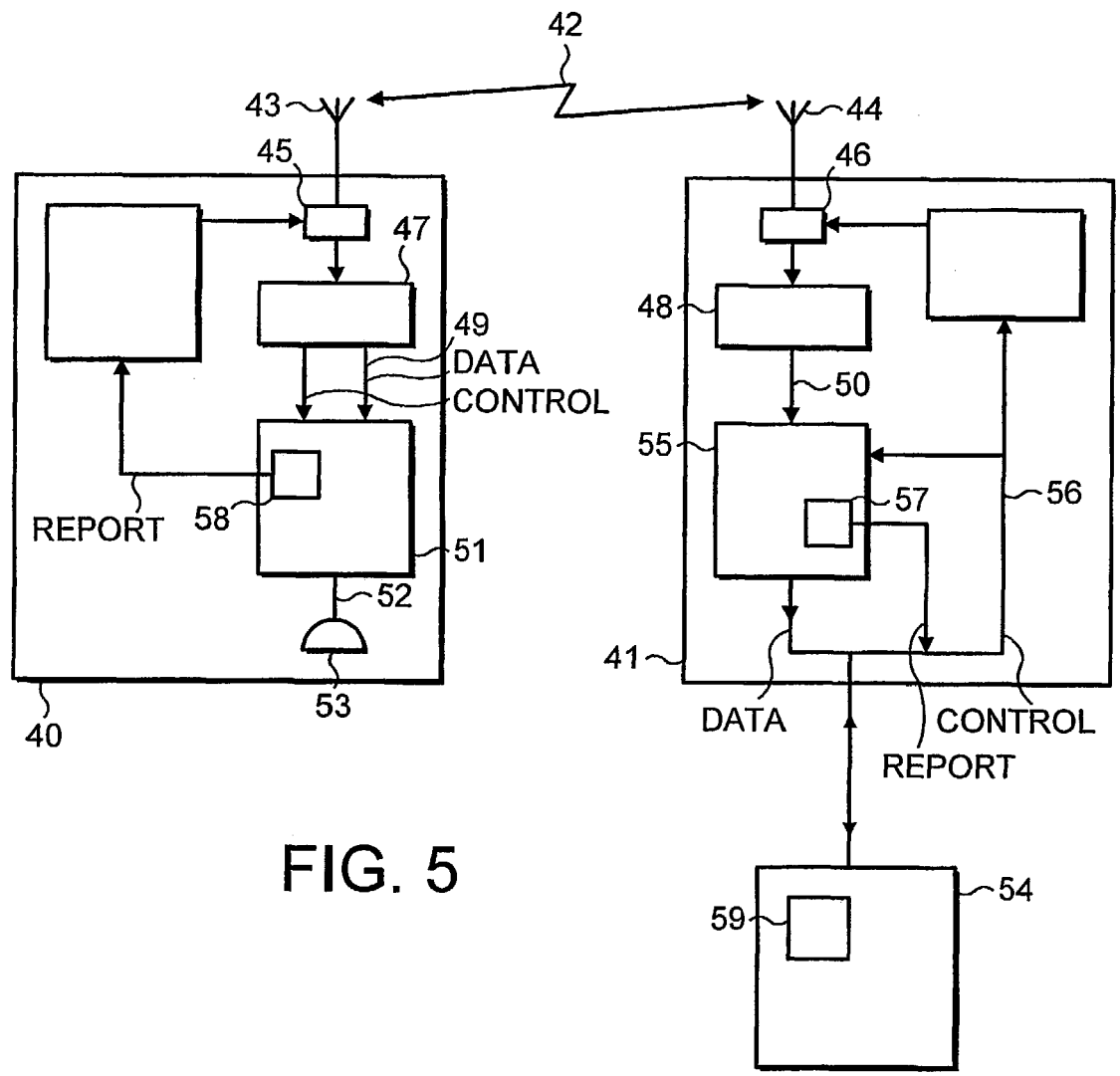

The present invention will now be described by way of example with reference to the accompanying drawings, in which FIG. 1 shows schematically a cellular network;
FIG. 2 illustrates data reception;
FIG. 3 illustrates AMR codec modes;
FIG. 4 shows simulated results of a the correlation between BFI and RxQual value (for FIXED codec mode: 4.75 kbit/s, dynamic channel profile "es11", full-rate channel, GSM downlink); and
FIG. 5 is a schematic diagram of relevant parts of a GSM cellular network.

The present example will be described with specific reference to the GSM system. However, the invention is not limited to application in the GSM system.

This invention is particularly advantageous in conjunction with the GSM Adaptive Multi-Rate (AMR) feature. AMR is an ETSI (European Telecommunications Standards Institute) specified next generation speech codes for GSM networks. The AMR codec consists of a family of codecs (source and channel codecs with different trade-off bit-rates) operating in the GSM full-rate (FR) and half-rate (HR) channels.

The ETSI AMR codec concept is intended to be capable of adapting its operation optimally according to the prevailing radio channel conditions. At the AMR receiving end (of the radio channel), the quality of the transmission is measured. Since the control of the used codec mode (source coding vs. channel coding bit-rate) is performed by the BTS, the mobile station is only able to send requests of appropriate downlink (DL) codec mode, which may be overwritten by the system. These requests are sent in-band in the uplink (UL) channel. The control of the UL codec mode by the BTS is based on quality measurements performed by the mobile station and/or the BTS itself. Using this information the BTS forces the mobile to use an appropriate codec mode by means of a codec mode command sent in-band on the downlink to mobile station. In high-error conditions more bits are used for error correction to obtain error robust coding, while in good transmission conditions only a relatively low proportion of bits is needed for sufficient error protection and more bits can therefore be allocated for source coding.

In the present approach, in order to be able to derive a more representative estimate of real connection quality onto which the RXQUAL settings may be mapped, an indication of the codec mode(s) in use on the uplink and/or the downlink is sent to the BSC. Using that information the BSC can perform handover and power control calculations, mapping the RXQUAL into a more realistic quality estimate, which may represent a frame erasure probability (FEP).

In the GSM system each multiframe provides 26 frames, of which a group of 24 frames are allocated for carrying traffic speech data for one user, and may therefore carry data encoded according to a selected speech codec. Signaling capacity limitations on the Abis interface (between the BTS and the BSC) mean that there are several possibilities for conveniently sending the necessary information to the BSC.

1) In a first route, the BSC would be sent information indicating:
   a) the codec used for each one of the 24 traffic channel frames on the uplink;
   b) the codec used for each one of the 24 traffic channel frames on the downlink;
   c) a RXQUAL (BER before channel decoding) value for each of the 24 traffic channel frames on the uplink;
   d) an average RXQUAL value for a plurality of frames of the downlink—preferably the 24 traffic frames of a single multiframe; (the RXQUAL of each individual DL frame is not available).

2) In a second route, the BSC would be sent for the uplink or the downlink or both, information indicating:
   a) the codec used in the first and last of the traffic channel frames of a multiframe;
   b) RXQUAL information averaged over a measurement period (which could suitably be the period of a multiframe).

3) In a third route, for the uplink or the downlink or both, the AMR scheme could be restricted so that link adaptation occurs only every $1/480$ ms, between multiframes. This would have the effect that the codec in use would remain constant throughout a multiframe. Then, for the uplink or the downlink or both, the BSC would be sent information indicating:
   a) the codec mode in use during the multiframe; and
   b) RXQUAL information averaged over a measurement period (which could suitably be the period of a multiframe).

Naturally also other alternatives are possible

The performance of the above mentioned routes is compared below.

The first route offers the best accuracy combined with the most flexible link adaptation (there being no restrictions on link adaptation rate). The third route is able to give the same accuracy in quality assessment, but the ability to react fast to changes in the channel is worse since the operation of the AMR system is restricted. Simulations performed by the applicant have indicated that this factor is generally not critical to performance: route 3 was able to offer even better link performance in certain simulations, especially in half rate mode. The reason for this is believed to be that in some cases the link was adapted even too aggressively in fast link adaptation while the actual link quality had already changed to opposite direction. Secondly, the first route consumes a significant amount of Abis signaling capacity, which may easily cause problems if the additional TRX-signaling is not taken into account in network planning. The second route offers a compromise in terms of quality estimation accuracy, as the actual quality has to be estimated as an average over used codec modes together with the RXQUAL information.

When the BSC has the knowledge of used codes modes and the RXQUAL associated to those modes, it can use a simple mapping table to convert the RXQUAL values into real connection quality or FEP, which can be used for example as a trigger in handover and power control algorithms.

FIG. 5 illustrates the architecture of a GSM system for implementing a preferred embodiment of the invention. FIG.

5 shows a mobile station 40 in radio communication with a base transmission station 41 over a wireless link 42. The antennae 43, 44 of the mobile station and the BTS are connected to respective duplexers 45, 46 which combine the incoming and outgoing signals. The generation of the outgoing signals for transmission is not illustrated in FIG. 5. The incoming signals are passed to respective amplification and demodulation units 47, 48 which derive received digital bitstreams at 49, 50. In the mobile station the received bitstream is processed by decoding apparatus shown generally at 51 to decode the data and derive an analogue speech signal at 52. The speech signal is applied to a loudspeaker 53 so that it can be heard by a user. In the BTS the received digital signal at 50 is transformed into a signal suitable for onward transmission to BSC 54 by means of processing unit 55.

The transmission power used over the link 42, the codec used for speech transmission over link 42, the estimated RXQUAL for link 42 and other parameters such as handover operations are under the control of a unit such as BSC 54. These parameters are transmitted from that control unit via link 56 to the respective MS and BTS units to allow them to encode, transmit and decode their signals accordingly.

In the units 51 and 55 are respective error rate detectors 57, 58 which determine error rates (suitably BER before channel decoding (including pseudo bit-error rates) or frame erasure rates) for received signals. (It should be noted that at least the mobile station does not have to calculate any statistical value of the frame errors (e.g. rate); instead the mobile could check the speech frames—frame by frame—and if a frame were found to have too many errors it could be not directed to the audio equipment of the mobile station. In that case the unit 51 could be omitted.) The error rate data is reported, together with data indicating the codec(s) in use (for example, as in one of the reporting routes discussed above) to the control unit—in this example BSC 54. The BSC 54 includes a handover/power-control processing unit 59 which uses that data to determine whether a modification of the communications operations between the BTS and the MS is needed. Such a modification may take the form of an increase or decrease in target RXQUAL (which may result in an increase or decrease in transmission power over the link between the BTS and the MS) or hard and/or soft handover commands to cause the MS to communicate with another base station.

By making use of knowledge of both the error rate and the data compression and/or encoding scheme in use over the link the BSC can make better decisions on the adjustment of RXQUAL targets, reducing the risk of RXQUAL being increased when high bit-error rates are being at least partly compensated for by compression schemes with high levels of redundancy, or being reduced when even low bit-error rates are being inadequately compensated for by compression schemes with low levels of redundancy.

Numerous modifications of the specific examples described above may be made. For example, the calculations may be performed by another unit than the BSC—for example an MSC. The approaches described above may be applied individually to the uplink or to the downlink, or to both. The approaches described above may be implemented in telecommunications systems operable according to other systems and standards, for example the third generation (3G) standard. In a system operable according to that standard the MSC, rather than the BSC, could handle handover and power control analysis. Reporting of data to the MSC could be performed over the Iu interface.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method for estimating quality of communications between a transmitter and a receiver, the method comprising:
   detecting an error rate of the communications as received;
   receiving at a quality estimation unit an indication of the detected error rate and an indication of the at least one of the plurality of compressed forms in use over the link; and
   the quality estimation unit estimating the quality of the communications based on both the indication of the detected error rate and the indication of the at least one of the plurality of compressed; and
   estimating the quality of communications over a communications link operable to carry data in at least one of a plurality of different compressed forms.

2. A method as claimed in claim 1, wherein the data is speech data.

3. A method as claimed in claim 1, wherein the different compressed forms are forms resulting from compression by different codecs.

4. A method as claimed in claim 3, wherein the codecs together form a multi-rate coding scheme.

5. A method as claimed in claim 4, wherein the speech encoding scheme is an adaptive multi-rate encoding scheme.

6. A method as claimed in claim 1, wherein the error rate is a bit error rate or a pseudo bit error rate.

7. A method as claimed in claim 1, wherein one of the transmitter and the receiver is a base transmission station under the control of a base station controller and the other of the transmitter and receiver is a mobile station.

8. A method as claimed in claim 7, wherein the quality estimation unit is located at the base station controller.

9. A method as claimed in claim 1, wherein the link is a traffic channel.

10. A method as claimed in claim 1, wherein the indication of the detected error rate includes information indicative of a detected error rate for communications over the link from the transmitter to the receiver and from the receiver to the transmitter.

11. A method as claimed in claim 10, wherein data over the link is sent in the form of data frames and the indication of the detected error rate includes a value of error rate for each frame for communications from the transmitter to the receiver, and an average value of error rate for a plurality of frames for communications from the receiver to the transmitter.

12. A method as claimed in claim 11, wherein the receiver is a mobile station and the transmitter is a base station.

13. A method as claimed in claim 1, wherein the indication of the detected error rate includes an average value of error rate for a plurality of frames for communications from the transmitter to the receiver.

14. A method as claimed in claim 1, wherein data over the link is sent from the transmitter to the receiver in the form of data frames and the indication of at least one of the plurality of compressed forms comprises an indication of one of the forms for each of the frames.

15. A method as claimed in claim 1, wherein data over the link is sent from the transmitter to the receiver in the form of data frames and the indication of at least one of the plurality of compressed forms comprises an indication of one of the forms for only some of the frames.

16. A method as claimed in claim 15, wherein the data over the link is sent from the transmitter to the receiver in the form of groups of data frames and the indication of at least one of the plurality of compressed forms comprises an indication of one of the forms for the first frame of each group and an indication of one of the forms for the last frame of each group.

17. A method as claimed in claim 16, wherein each group of frames corresponds to a measurement period.

18. A method as claimed in claim 17, wherein said measurement period is 480 ms.

19. A method as claimed in claim 15, wherein the data over the link is sent from the transmitter to the receiver in the form of groups of data frames and the indication of at least one of the plurality of compressed forms comprises an indication of one of the forms for a single frame of each group.

20. A method as claimed in claim 1, comprising the step of limiting the transmitter and the receiver to using a single one of the compressed forms over the link in each measurement period.

21. A method as claimed in claim 1, wherein the transmitter and the receiver are operable according to the Global System for Mobile Communications or a derivative thereof.

22. A communications system comprising:
a transmitter and a receiver configured to communicate over a communications link operable to carry data in at least one of a plurality of different compressed forms;
error rate detection apparatus configured to detect an error rate of the communications as received; and
a quality estimation unit configured to receive an indication of the detected error rate and an indication of the at least one of the plurality of compressed forms in use over the link, and estimating the quality of the communications based on both the indication of the detected error rate and the indication of the at least one of the plurality of compressed forms.

23. A network element for operation in a communications system in which a transmitter and a receiver can communicate over a communications link operable to carry data in at least one of a plurality of different compressed forms; the network element comprising:
a transmitter or a receiver configured to communicate over a communications link operable to carry data in at least one of a plurality of different compressed forms;
error rate detection apparatus configured to detect an error rate of the communications as received; and
a quality estimation unit configured to receive an indication of the detected error rate and an indication of the at least one of the plurality of compressed forms in use over the link, and estimating the quality of the communications based on both the indication of the detected error rate and the indication of the at least one of the plurality of compressed forms.

24. A network element as claimed in claim 23 wherein the network element comprises a handover or power-control processing unit.

25. A network element as claimed in claim 23 wherein the network element comprises a base station controller.

26. A quality estimation unit configured to:
receive from an error rate detection apparatus an indication of a detected error rate of communications received over a communication link;
receive an indication of at least one of plurality of compressed forms in use over the link; and
estimate the quality of the communications based on the indication of the detected error rate and the indication of the at least one of the plurality of compressed forms,
wherein the quality estimation unit is configured for operation in a communications system in which a transmitter and a receiver communicates over the communications link operable to carry data in the at least one of a plurality of different compressed forms.

27. A mobile station for receiving communications over a communications link, the mobile station comprising:
an error rate detection unit configured to detect an error rate of communications as received; and
a quality estimation unit configured to receive an indication of the detected error rate and an indication of the at least one of a plurality of compressed forms in use over the link, and estimating the quality of the communications by means of the indication of the detected error rate and the indication of the at least one of a plurality of compressed forms,
wherein the mobile station is configured to receive communications over the communications link operable to carry data in at least one of the plurality of different compressed forms.

* * * * *